United States Patent [19]

Ryder et al.

[11] Patent Number: 4,922,387

[45] Date of Patent: May 1, 1990

[54] HORIZONTAL ZERO ADJUSTMENT FOR AUTOMOTIVE HEADLAMP

[75] Inventors: Francis E. Ryder; Stephen P. Lisak, both of Arab, Ala.

[73] Assignees: Ryder International Corporation, Arab, Ala.; Textron Inc., Providence, R.I.

[21] Appl. No.: 313,093

[22] Filed: Feb. 21, 1989

[51] Int. Cl.$^5$ .......................... B60Q 1/00; G01B 5/24
[52] U.S. Cl. ..................................... 362/61; 362/287; 362/289; 362/419; 362/80; 33/288; 33/678
[58] Field of Search ................... 362/61, 80, 285, 287, 362/289, 418, 419, 274, 275, 269, 427, 430, 66; 33/644, 645, 285, 288, 335, 379, 333, 678

[56] References Cited

U.S. PATENT DOCUMENTS

| | | | |
|---|---|---|---|
| 1,609,634 | 12/1926 | Ryan | 33/370 |
| 2,058,743 | 10/1936 | Trippe | 33/333 |
| 3,612,854 | 10/1971 | Todd et al. | 33/288 |
| 3,694,090 | 9/1972 | Ohyama | 33/379 |
| 4,802,067 | 1/1989 | Ryder et al. | 362/61 |

FOREIGN PATENT DOCUMENTS 192688 11/1906 Fed. Rep. of Germany .

OTHER PUBLICATIONS 2 pages of drawings, "Minimount Quad System", dated Jul. 8, 1988.

*Primary Examiner*—Ira S. Lazarus
*Assistant Examiner*—D. M. Cox
*Attorney, Agent, or Firm*—R. A. Giangiorgi

[57] ABSTRACT

A headlamp aiming apparatus is provided for attachment to an automotive headlamp assembly which includes a frame member rigidly mountable to an automotive vehicle and a headlamp mounted to the frame member for pivotal motion about a horizontal and/or vertical axis of the headlamp for aiming the headlamp beam. The apparatus includes an aim-indicating arrangement having a housing mounted for movement in unison with a given surface of the headlamp so that the housing is movable with the headlamp during aiming. A headlamp adjusting assembly is operatively coupled with the housing for producing movement of both the housing and the headlamp relative to the frame member for achieving the aimed condition. An indicator adjusting assembly is provided for adjusting of the aim-indicating means to indicate an aimed condition of the associated headlamp and, in particular, while the headlamp is in a condition wherein the beam is aimed as desired responsive to adjustment by the headlamp adjusting assembly. Accordingly, the headlamp adjusting assembly may be thereafter adjusted as necessary until the aim-indicating arrangement indicates said aimed condition to thereby assure proper subsequent aiming of the headlamp beam.

12 Claims, 3 Drawing Sheets

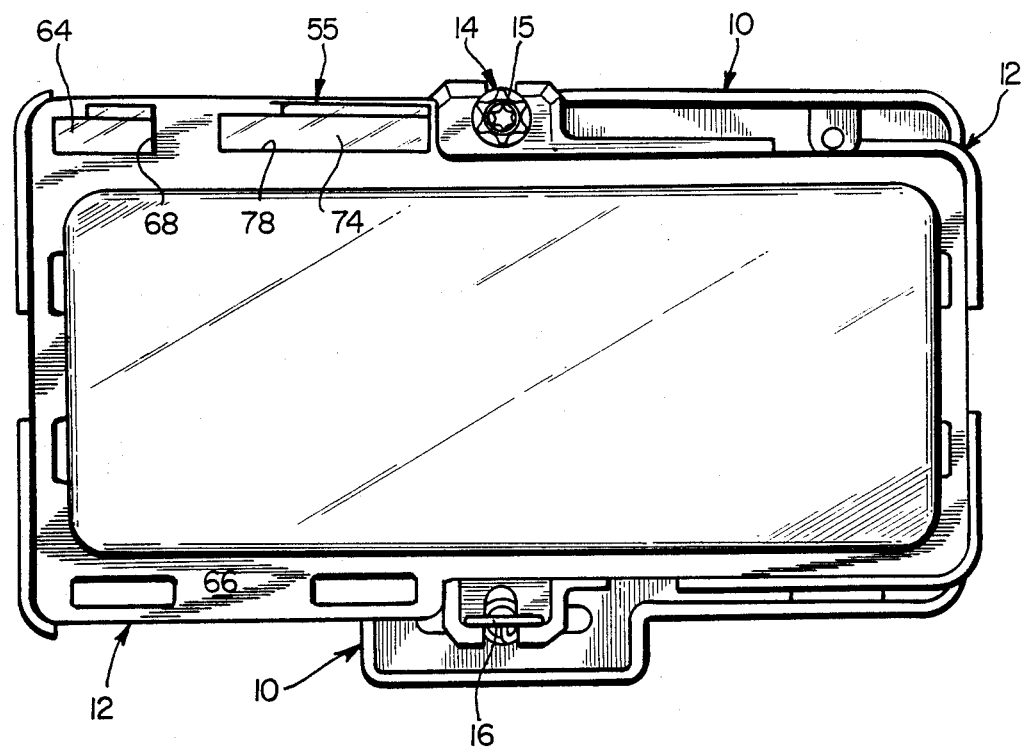
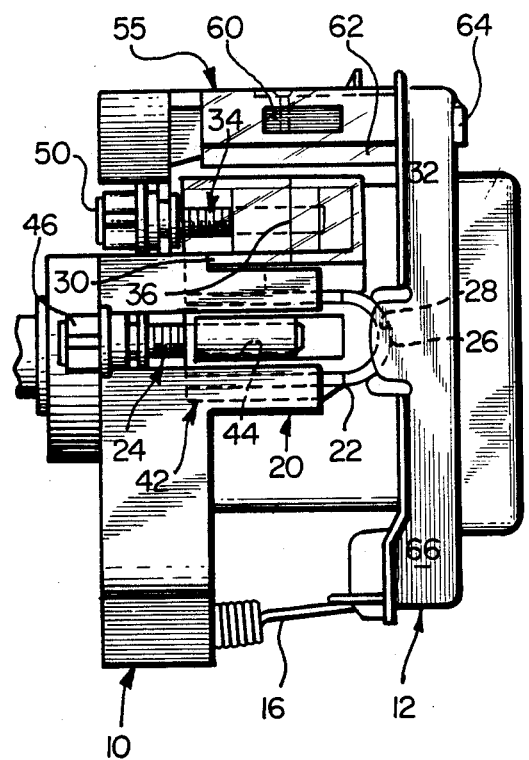
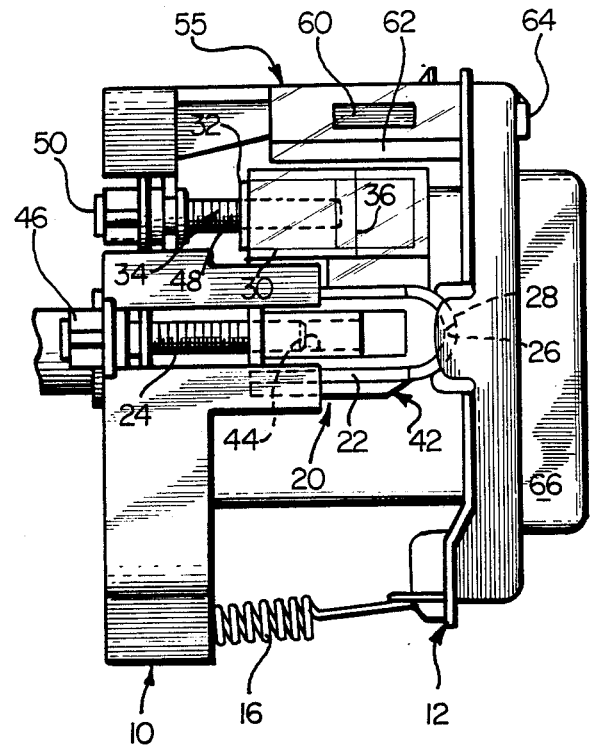

HORIZONTAL ZERO ADJUSTMENT FOR AUTOMOTIVE HEADLAMP

BACKGROUND OF THE INVENTION

This invention relates generally to adjustable automotive headlamp assemblies, and more particularly to a novel and improved headlamp aiming apparatus for facilitating the proper aiming of a headlamp beam upon installation of a headlamp on an automotive vehicle, or at any time thereafter.

A number of headlamp adjusting and aiming systems have been heretofore proposed for automotive vehicles. For example, separately mounted sealed-beam type headlamps commonly require independent adjustment utilizing adjusting screws or the like. However, other types of headlamp assemblies are now being used which provide unitary housing or frame and lamp assemblies which are designed to fit aerodynamically styled automotive body contours. Such modern headlamp assemblies may include various automated or semi-automated adjusting mechanisms for adjusting both vertical and horizontal positions or angular orientations of the lamp for aiming the light beam.

However there has heretofore been no relatively simple arrangement to obtain the proper aiming of a headlamp beam by adjustment of the headlamp angular position, once the headlamp has been installed on the automotive vehicle. Rather, it has heretofore generally been necessary to follow a time-consuming procedure to achieve proper headlamp aiming. This procedure generally requires placing the vehicle on a level surface and utilizing either a special instrument or a standardized aiming target. Often, access to the adjustment screws or other adjusting means is difficult and requires partial disassembly, specialized tools, and the like. As such, it has heretofore been difficult or impossible for the consumer or, indeed, anyone without access to the required equipment, instruments, tools or the like to achieve proper headlamp aiming.

In our prior Pat. No. 4,802,067 issued Jan. 31, 1989, we disclose a novel level-indicating device which can be easily installed or mounted to the headlamp assembly during manufacture of the same and is thereafter movable in unison with the headlamp so as to indicate when the headlamp is in a level (i.e., up-down tilting) condition. This level indicating device generally utilizes a bubble-type of level which is initially movable relative to the headlamp, such that the headlamp can be factory adjusted (i.e., by tilting up or down as necessary) to the desired level condition on a test fixture or the like. Thereupon, the leveling device of our aforesaid copending application is adjusted until the bubble level indicates a level condition. The device is then rigidly fixed relative to the headlamp and/or housing such that it cannot be further moved or adjusted relative thereto. Accordingly, the consumer or other installer can thereafter readily relevel the headlamp relative to a vehicle standing on a level surface by merely adjusting the pitch or aiming of the headlamp until this level-indicating device or bubble level once again indicates a level condition. This then assures that the headlamp itself and more particularly the headlamp beam is at its desired level condition.

As a further feature of our aforesaid copending application, we have developed a device which includes an angled or prism-like housing for permitting viewing of the level-indicating device or bubble level from a convenient location on the vehicle. Usually, this location is from the front of the vehicle and the corresponding front surface of the headlamp or headlamp assembly. It will be appreciated, however, that the bubble-type level will have its axis normally inclined perpendicular or at right angles to this front surface for the desired leveling and level-indicating function.

The present invention provides an additional aiming or aim-indicating device or apparatus. This additional apparatus is generally for indicating a so-called "zero" horizontal or properly aimed position of a headlamp beam in a left-to-right or side-to-side fashion. It will be appreciated that the above-described type of leveling device was utilized to indicate the proper up-down or top-to-bottom level condition of the headlamp beam. Preferably, the present invention provides the additional side-to-side aiming, which also preferably provides visual means for visual inspection for proper aiming from a convenient point, such as at the front surface of the headlamp. The present invention contemplates providing such an aiming indicator for a headlamp either alone or in connection with the above-mentioned leveling or top-to-bottom adjustment indication for the headlamp.

OBJECTS AND SUMMARY OF THE INVENTION

Accordingly, it is an object of the invention to provide a novel and improved headlight aiming apparatus for use in aiming a headlamp beam of a headlamp of an automotive vehicle.

Briefly, and in accordance with the foregoing objects, a headlamp aiming apparatus in accordance with the invention comprises aim indicating means including a housing; means for mounting said housing for movement in unison with a given surface of said headlamp as said headlamp moves pivotally relative to said frame member such that said housing is movable with said headlamp to a desired aimed condition; headlamp adjusting means operatively coupled with said housing for producing movement of both said housing and said headlamp relative to said frame member for achieving said aimed condition; indicator adjusting means for adjustment of the aim-indicating means to indicate an aimed condition of the associated headlamp; said indicator adjusting means being adjustable to provide said indication of said aimed condition by said aim-indicating means while the headlamp is in a condition wherein the beam is aimed as desired responsive to adjustment by said headlamp means; whereby said indicator adjusting means may be thereafter adjusted as necessary until said aim-indicating means indicates said aimed condition to thereby assure proper subsequent aiming of the headlamp beam.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawing in which like reference numerals identify like elements, and in which:

FIG. 1 is a front elevation of a headlamp assembly in connection with which the novel aiming or horizontal "zero" adjustment apparatus of the invention may advantageously be utilized;

FIG. 2 is a side elevation of the assembly of FIG. 1;

FIG. 3 is a side elevation similar to FIG. 2, indicating the procedure for aiming the headlamp in accordance with the present invention;

DETAILED DESCRIPTION OF THE ILLUSTRATED EMBODIMENT

Figure 5:
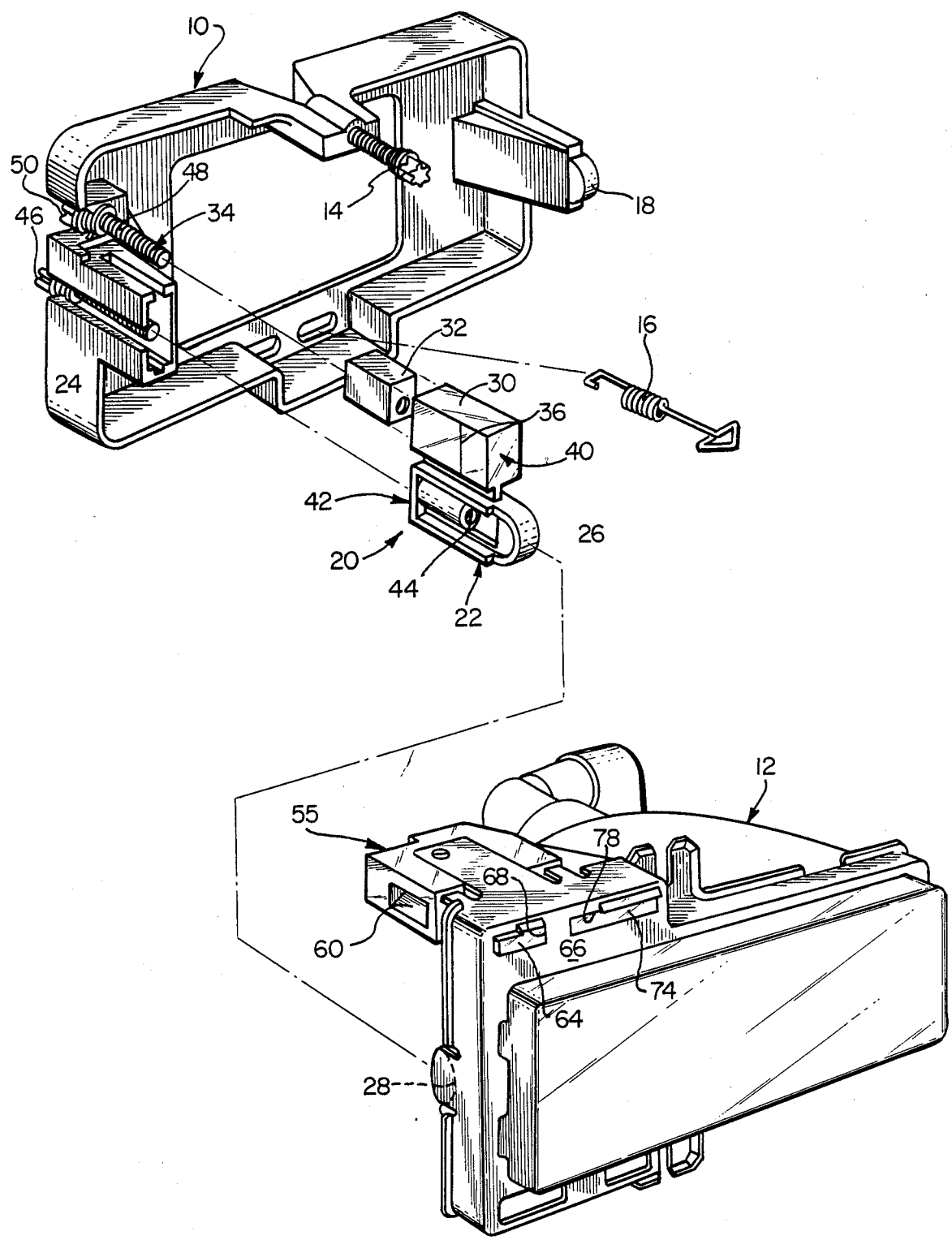
FIG. 5 is an exploded view of the headlamp assembly of FIG. 1.

Referring now to the drawings, and initially to FIGS. 1, 2 and 5, a headlight aiming apparatus for attachment to an automotive headlamp assembly is shown in front elevation and side elevation, respectively. The illustrated headlamp assembly comprises a frame member 10 which is rigidly mountable to an automotive vehicle and a headlamp member or assembly 12 which is mounted to the frame member for pivotal motion about at least one of a horizontal axis 11 and a vertical axis 13 of the headlamp. Preferably, the headlamp 12 is movable relative to the frame 10 about a central vertical axis thereof and about a central horizontal axis thereof to allow proper leveling and side-to-side aiming of the headlamp beam. It will be understood, however, that the apparatus of the invention may be utilized in connection with headlamp assemblies other than that illustrated herein, which has been shown for purposes of illustration and in no way limits the invention.

In the illustrated embodiment, the headlamp assembly 12 is held for pivotal movement relative to the frame by a vertical adjustment member 14, comprising an elongate threaded member or screw having a driver head 15 at a center top portion thereof, and a tension spring member 16 at a center bottom portion thereof. Preferably the adjustment member 15 and spring 16 are substantially centered on the central vertical axis 13 of the frame 10 and headlamp 12. As will be more fully described later, the headlamp rocks about a first support member or edge 18 and a second support member or surface 26, which are generally horizontally centered at opposite lateral sides thereof. Accordingly, the headlamp is held for vertical or up-down pivotal motion relative to support members or surfaces 18 and 26, in response to threaded advancement and retraction of the vertical adjustment member or screw 14. In this regard the adjustment screw is preferably mounted with its driver head 15 held captive in a notch or cutout portion at a top part of the headlamp assembly 12 and with its elongate threaded body threadably engaged with a complementary internal thread formed on a portion of the frame member 10. This arrangement may be reversed, if desired, although it is preferable to provide access to driver head 15 from the front of the headlamp.

The aiming apparatus of the invention preferably comprises aim-indicating means indicated by reference numeral 20. This indicating means includes a housing 22 which is mounted for movement in unison with a given surface of the headlamp 12 as the headlamp moves pivotally relative to the frame member 10, such that the housing 22 is movable with the headlamp to its desired aimed condition. In the illustrated embodiment, the housing 22 is mounted for bidirectional movement in the horizontal direction as viewed in FIG. 2, in response to rotation of an adjustment member or screw 24 ("headlamp adjusting means"), which will be more fully described later herein. An outer end surface of the housing 22 forms the above-mentioned support surface 26, which is held in abutting and engaged condition with a back rear edge surface portion 28 of headlamp assembly 12, by the above-mentioned vertical adjustment or leveling member or screw 14 and tension spring 16. The housing 22 is further held for stable horizontal bidirectional motion at an elongate cavity portion 30 which has an indicator member 32 of complementary shape for slidable movement therealong, the indicator member 32 being in turn mounted to a second, indicator adjusting means or adjustment member or screw 34.

This indicator adjustment member 34 is similar to the headlamp adjusting member 24, but serves only to advance and retract the indicator member 32 relative to the cavity 30 for alignment with a prescored or otherwise preformed aiming or zeroing mark or indicia 36 on the body of the housing 22 overlying cavity 30. Accordingly, the headlamp adjusting means serves for adjustment of the aim-indicating means to indicate an aimed condition of the headlamp by aligning the indicator 32 with the indicia 36. The previously mentioned adjustment member 24, on the other hand, comprises headlamp adjusting means which is coupled with the housing 22 so as to produce movement of both the housing and headlamp relative to the frame member for achieving the aimed condition of the headlamp beam. Accordingly, in operation, and as shown in the sequence of views in FIGS. 2-4, the headlamp adjusting means or screw 24 is preferably first adjusted at the factory to achieve the correct or desired aimed condition of the headlamp relative to the frame. This initial adjustment is indicated by the moved position of the housing 22 and headlamp 12 relative to frame 10 which has been achieved by suitable rotation of the adjustment member or screw 24, as between FIGS. 2 and 3.

Figure 4:
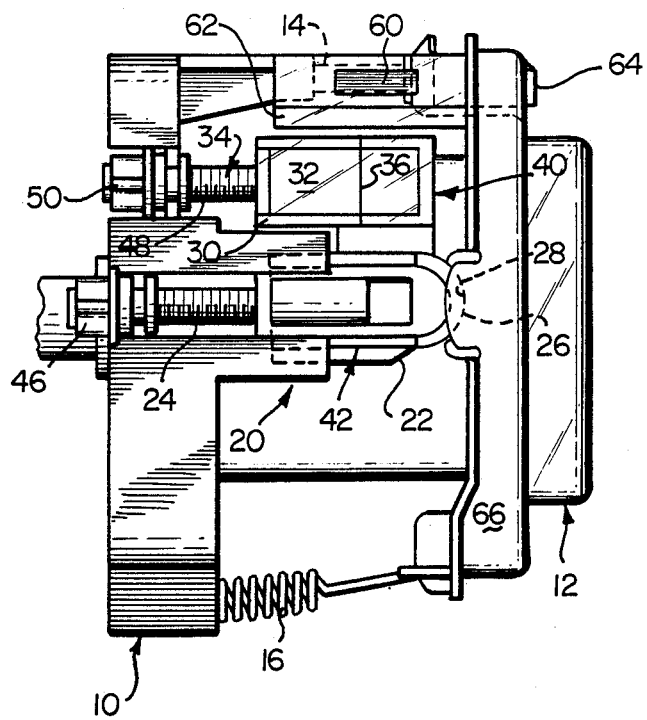
FIG. 4 is a side elevation similar to FIGS. 2 and 3, indicating the procedure for aiming the headlamp in accordance with the present invention.

Thereupon, the indicator adjusting means 34 is rotated to produce a corresponding slidable movement of the indicator member 32 within the cavity 30 to again align with the adjustment or zeroing mark or indicia 36. This "zeroing" procedure is indicated in FIG. 4. Accordingly, the headlamp is now in its desired aimed condition with respect to horizontal or side-to-side aiming of the headlamp beam, and the alignment of the indicator 32 with the mark 36 indicates this condition. Thereafter, the indicator adjusting member 34 should not be disturbed and, in fact, the same may be fixed against further rotation by application of a suitable adhesive, by providing a driver head portion thereof with a specialized configuration, or by other suitable means.

Accordingly, when the headlamp assembly is thereafter installed on a vehicle or at any time thereafter, the proper side-to-side aiming is to be checked or corrected, it is necessary only to rotate the adjusting screw 24. This will then move the entire housing 22 so as to not only adjust the headlamp, but also to simultaneously move, the indicator relative to indicia 36. When the indicator realigns with indicia 36, it is therefore assured that the headlamp will once again be in its pre-adjusted factory-aimed condition.

Turning now to the other drawing figures, further details of the foregoing assembly will now be further described. Referring to FIG. 5, it will be seen that the housing 22 has a transparent portion 40 and this transparent portion is that which defines the elongate cavity 30 within which the indicator member 32 is slidably mounted. Preferably the indicator member 32 is opaque to facilitate viewing of the position of the same within the transparent housing portion 40 and in particular relative to the zeroing line or indicia 36 which is formed thereupon. This zeroing line 36 thus provides aim-indicating indicia means on the housing adjacent its transparent portion which overlies a portion of the elongate cavity 30.

It will be appreciated from the foregoing that the indicator member is mounted to the housing and to the indicator adjusting means 34 such that operation of the headlamp adjusting means or member 24 will bidirectionally move the entire housing, including portion 40 and cavity 30 relative to the indicator 32, while the indicator adjusting means 34 will operate to move only the indicator member 32 relative to cavity 30. Accordingly, the indicator member 32 amy be moved into registry with the indicia 36 by adjustment of either of the headlamp adjusting means or member 24 and indicator adjusting means or member 34. Hence the above-described mode of operation is enabled by this form of assembly, wherein the headlamp is first aimed as desired, and thereafter the indicator is moved into registry with the indicia or mark 36. Thereafter, further movement of the indicator adjusting means 34 is preferably precluded by suitable means, such that the headlamp may be thereafter re-aimed if necessary by movement of the aiming adjustment means 24 only, until the indicator member 32 again comes into registry or alignment with the zeroing line or indicia 36.

As best viewed in FIG. 5, the housing 22 includes the portion 40 forming the elongated cavity and also a second portion 42 which is formed with a complementary internal thread 44 for engaging the adjustment means or member 24. In this regard the adjustment member 24 comprises an elongate threaded member having a driver head portion 46 which, as best viewed in FIGS. 2-4, is held rotatably captive in a suitable cutout, notch or aperture provided therefor in the body of the frame member 10. Accordingly, rotation of the driver head 46 will result in bidirectional axial movement of the housing 22 with respect to the axis of the thread 44 and threaded member 24. Thread 44 is therefore located to open at an end of the housing 22, generally opposite its end 26 which, it will be remembered, abuts a back portion of the headlamp at surface 28 to achieve a generally rocking motion of the same for vertical adjustment.

In similar fashion, the adjustment member 34 comprises a screw-like member substantially similar, if not identical, to adjustment member 24. The adjustment member 34 has an elongate threaded shaft 48 which threadably interfits with a complementary internal thread in the indicator means or member 32. A driver head portion 50 of adjustment means or member 34 is similarly held in captive fashion in a suitable cutout notch or aperture formed in the body of the frame 10 therefor. Accordingly, rotation of driver head 50 will cause bidirectional threadable movement of indicator member 32 relative to the axis of the threaded shaft portion 48 and corresponding slidable movement of indicator member 32 relative to the cavity 30.

Figure 6:
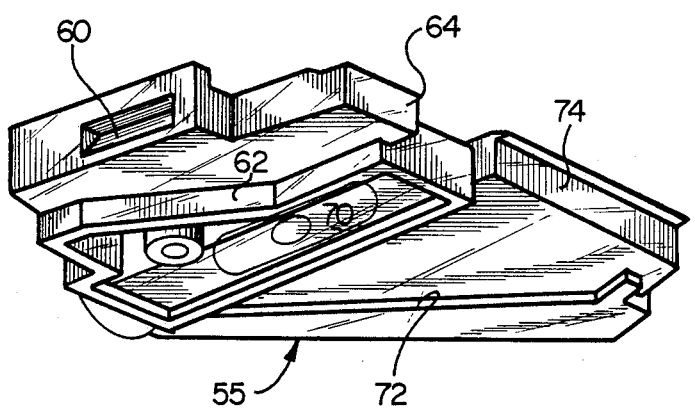
FIG. 6 is a bottom perspective view of a combined aiming and leveling viewing device in accordance with one aspect of the invention.
Figure 7:
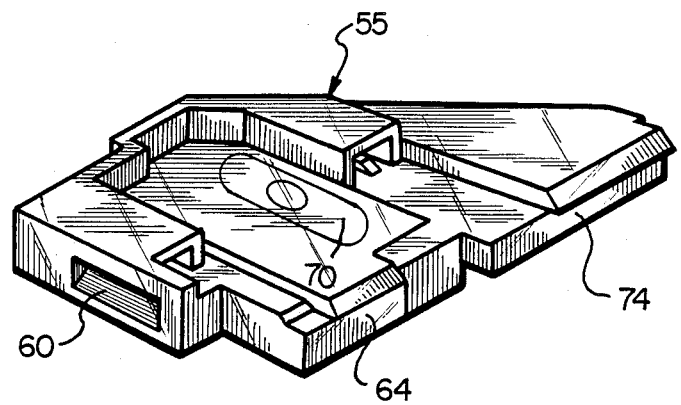
FIG. 7 is a top perspective view of the device of FIG. 6.

Referring now also to FIGS. 6 and 7, the aiming adjustment and indicator means thus far described may be advantageously combined further with an additional viewing means or reflective means to permit viewing of the indicator (i.e., indicator member 32 and zeroing mark or indicia 36) indirectly. For example, it may be desirable to view the aiming indicator arrangement from a front surface of the headlamp corresponding to the front end of the vehicle upon which the same is mounted. To this end, an additional viewing member or assembly 55 is provided which comprises at least first and second surfaces 60, 62 at least one of which is a reflective surface.

In the illustrated embodiment, both surfaces 60 and 62 are reflective surfaces. The aim-indicating means, comprising at least indicia 36 and some suitable area to either side thereof (i.e., to permit viewing as to whether indicator 32 is in or out of registry with the indicia), are aligned with the first reflective surface 60, while the reflective surface 62 is suitably angled to provide a reflection from surface 60 to a front surface 64 of the viewing means or member 55. In the illustrated embodiment, this viewing surface 64 is generally aligned with a front surface of the headlamp housing. Moreover, in the illustrated embodiment, the headlamp housing is provided with a suitable frame-like surround portion 66 having a through aperture 68 for receiving surface portion 64 therethrough for conveniently mounting the same viewing. In the illustrated embodiment, the viewing means or member 55 is positioned at a topmost surface of the headlamp. However, it will be appreciated that the angles and locations of reflective surfaces 60 and 62 may be varied to accommodate mounting thereof at other desired positions relative to the headlamp assembly. In the illustrated embodiment, the alignment of viewing means or member 55 is such that reflective surface 60 is generally directly above the indicia or zeroing line 36 and extends for some distance along cavity 30 to either side thereof. Reflective surface 60 is tilted at about a forty-five degree angle with respect to vertical and horizontal axes of the headlamp. Similarly, reflective surface 62 is aligned with and spaced apart somewhat from reflective surface 60 and is angled at a forty-five degree angle with respect to the front or viewing surface 64.

In the embodiment illustrated for purposes of description, a second or leveling indicator means is also provided for indicating the achievement of proper up/-down aiming or leveling of the headlamp beam. This second indicator is provided for use in connection with the vertical or up-down leveling screw or adjustment member 14. This latter leveling indicator generally comprises a bubble-type level which extends generally in parallel with the axis of the adjustment screw or member 14, and is mounted within a preferably clear plastic housing which, in the illustrated embodiment, is formed as an integral one-piece unit with the viewing assembly or means 55 heretofore described. In similar fashion to the reflective means 60, 62, a further reflective surface 72 is provided at an angle of approximately forty-five degrees with both bubble level 70 and a second viewing window or surface 74 which is preferably aligned together with window 64, for viewing at the front of the headlamp assembly. Preferably, a similar cutout 78 is provided for this second viewing surface or window 74. In all other respects the purpose and operation as well as the structural details of the bubble-type level 70, reflective surface 72 and window 74 are substantially as shown and described in our above-referenced U.S. Pat. No. 4,802,607 and need not be further described herein.

Suffice it to say that once an up-down level condition of the headlamp is achieved by manipulation of vertical adjustment 14, for example on a test fixture or the like, the viewing means or housing 55 may be suitably tilted to cause a level indication to be given by the bubble level 70. The member 55 is then preferably locked in this position with respect to its vertical tilt or front-to-back inclination relative to the axis of bubble level 70. Thereafter, it will be appreciated that leveling of a headlamp may be achieved, assuming the vehicle is on a level surface, by adjusting headlamp vertical adjustment member 14 until the bubble level again indicates a level condition. Preferably, both the housing 22 and the viewing member 55 are formed of clear plastics materials.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A headlight aiming apparatus for attachment to an automotive headlamp assembly comprising a frame member which is rigidly mountable to an automotive vehicle and a headlamp which is mounted to the frame member for pivotal motion about at least one of a horizontal axis and a vertical axis of the headlamp for aiming of the headlamp beam, said aiming apparatus comprising: aim-indicating means including a housing, means for mounting said housing for movement in unison with a given surface of said headlamp as said headlamp moves pivotally relative to said frame member such that said housing is movable with said headlamp to a desired aimed condition; headlamp adjusting means operatively coupled with said housing for producing movement of both said housing and said headlamp relative to said frame member for achieving said aimed condition; indicator adjusting means for adjustment of the aim-indicating means to indicate an aimed condition of the associated headlamp; said indicator adjusting means being adjustable to provide said indication of said aimed condition by said aim-indicating means while the headlamp is in a condition wherein the beam is aimed as desired responsive to adjustment by said headlamp adjusting means; whereby said headlamp adjusting means may be thereafter adjusted as necessary until said aim-indicating means indicates said aimed condition to thereby assure proper subsequent aiming of the headlamp beam; wherein said aim-indicating means comprises a transparent portion of said housing, an elongate cavity generally defined within said transparent portion, an indicator member mounted for slidable movement along said cavity and aim-indicating indicia means on said transparent portion and overlying a portion of said cavity; said indicator member being mounted to said housing and to said indicator adjusting means such that the headlamp adjusting means will operate to bidirectionally move the cavity relative to the indicator member and said indicator adjusting means will operate to move the indicator member relative to the cavity, such that said indicator member may be moved into registry with said indicia by adjustment of either of said headlamp adjusting means or said indicator adjusting means.

2. Apparatus according to claim 1 wherein said means for mounting said housing for movement in unison with a given surface of said headlamp comprises means coupled to said headlamp and to said frame member for holding said given surface of the headlamp in abutting condition with a first end of said housing; wherein said indicator adjusting means is located at a second end of the housing generally opposite said first end; wherein said elongate cavity extends between said first and second ends of said housing, and wherein said headlamp adjusting means is mounted for generally advancing and retracting said housing in a direction defined between its first end and its second end to thereby correspondingly advance and retract the cavity portion thereof relative to the indicator means.

3. Apparatus according to claim 1 and further including reflective means coupled with said headlamp; said aim-indicating means being aligned with said reflective means, and said reflective means being oriented relative to said headlamp and frame for permitting viewing of a reflected image of said aim-indicating means from a desired orientation relative to said headlamp.

4. Apparatus according to claim 1 wherein said headlamp adjusting means comprises an elogate threaded member having a driver head at one end thereof rotatably mounted to said frame member and a through aperture formed in said housing and having a complementary internal thread therein for receiving said elongate member for threadably advancing and retracting said housing to achieve a corresponding tilting of the headlamp relative to the frame member for aiming of the headlamp beam.

5. Apparatus according to claim 1 wherein said indicator adjusting means comprises an elongate threaded member having a driver head at one end thereof rotatably mounted to said frame member and a through aperture in said indicator member having a complementary internal thread therein for receiving said elongate member for threadably advancing and retracting said indicator member relative to said elongate cavity.

6. Apparatus according to claim 1 and further including leveling means for achieving up-down leveling of said headlamp beam and comprising level-indicating means; means for mounting said level indicating means to a given surface of said headlamp, such that upon varying the inclination of the headlamp to a level condition, adjustment may be made to the level indicating means to indicate a level condition; and means for preserving said indication of a level condition once said adjustment is made, whereby upon installation of the headlamp upon a vehicle, the headlamp may be adjusted until the level-indicating means again reaches the preserved indication of a level condition, to thereby assure proper subsequent leveling of the headlamp beam.

7. Apparatus according to claim 6 and further including viewing means having at least first and second surfaces disposed at a relative angle, said level-indicating means being aligned with one of said first and second surfaces, and the other of said first and second surfaces forming a reflective surface for permitting viewing of a reflected image of the level-indicating means.

8. Apparatus according to claim 7 and further including reflective means associated with said aim-indicating means, said aim-indicating means being aligned with said reflective means, and said reflective means being oriented relative to said headlamp for convenient viewing of a reflected image of the aim-indicating means from a desired orientation relative to said headlamp.

9. Apparatus according to claim 8 wherein said reflective means and said viewing means are aligned for permitting viewing of both said level-indicating means and said aim-indicating means at the same surface of said headlamp.

10. Apparatus according to claim 8 wherein said reflective means and said viewing means are formed as a one-piece integral member.

11. A headlight aiming apparatus for attachment to an automotive headlamp assembly comprising a frame member which is rigidly mountable to an automotive vehicle and a headlamp which is mounted to the frame member for pivotal motion about at least one of a horizontal axis and a vertical axis of the headlamp for aiming of the headlamp beam, said aiming apparatus comprising:

aim-indicating means including a housing, means for mounting said housing for movement in unison with a given surface of said headlamp as said headlamp moves pivotally relative to said frame member such that said housing is movable with said headlamp to a desired aimed condition; headlamp adjusting means operatively coupled with said housing for producing movement of both said housing and said headlamp relative to said frame member for achieving said aimed condition; indicator adjusting means for adjustment of the aim-indicating means to indicate an aimed condition of the associated headlamp; said indicator adjusting means being adjustable to provide said indication of said aimed condition by said aim-indicating means while the headlamp is in a condition wherein the beam is aimed as desired responsive to adjustment by said headlamp adjusting means; whereby said headlamp adjusting means may be thereafter adjusted as necessary until said aim-indicating means indicates said aimed condition to thereby assure proper subsequent aiming of the headlamp beam; wherein said headlamp adjusting means comprises an elongate threaded member having a driver head at one end thereof rotatably mounted to said frame member and a through aperture formed in said housing and having a complementary internal thread therein for receiving said elongate member for threadably advancing and retracting said housing to achieve a corresponding tilting of the headlamp relative to the frame member for aiming of the headlamp beam.

12. A headlight aiming apparatus for attachment to an automotive headlamp assembly comprising a frame member which is rigidly mountable to an automotive vehicle and a headlamp which is mounted to the frame member for pivotal motion about at least one of a horizontal axis and a vertical axis of the headlamp for aiming of the headlamp beam, said aiming apparatus comprising:

aim-indicating means including a housing, means for mounting said housing for movement in unison with a given surface of said headlamp as said headlamp moves pivotally relative to said frame member such that said housing is movable with said headlamp to a desired aimed condition; headlamp adjusting means operatively coupled with said housing for producing movement of both said housing and said headlamp relative to said frame member for achieving said aimed condition; indicator adjusting means for adjustment of the aim-indicating means to indicate an aimed condition of the associated headlamp; said indicator adjusting means being adjustable to provide said indication of said aimed condition by said aim-indicating means while the headlamp is in a condition wherein the beam is aimed as desired responsive to adjustment by said headlamp adjusting means; whereby said headlamp adjusting means may be thereafter adjusted as necessary until said aim-indicating means indicates said aimed condition to thereby assure proper subsequent aiming of the headlamp beam; and further including leveling means for achieving up-down leveling of said headlamp beam and comprising level-indicating means; means for mounting said level indicating means to a given surface of said headlamp, such that upon varying the inclination of the headlamp to a level condition, adjustment may be made to the level indicating means to indicate a level condition; and means for preserving said indication of a level condition once said adjustment is made, whereby upon installation of the headlamp upon a vehicle, the headlamp may be adjusted until the level-indicating means again reaches the preserved indication of a level condition, to thereby assure proper subsequent leveling of the headlamp beam.

* * * * *